Aug. 5, 1952 — W. R. PETERSON — 2,605,990
APPARATUS FOR FILLING VALVE BAGS
Filed Sept. 12, 1946 — 7 Sheets-Sheet 1

INVENTOR.
WILLIAM R. PETERSON.
BY
ATTORNEYS.

INVENTOR.
WILLIAM R. PETERSON.
BY Ward, Crosby & Neal
ATTORNEYS.

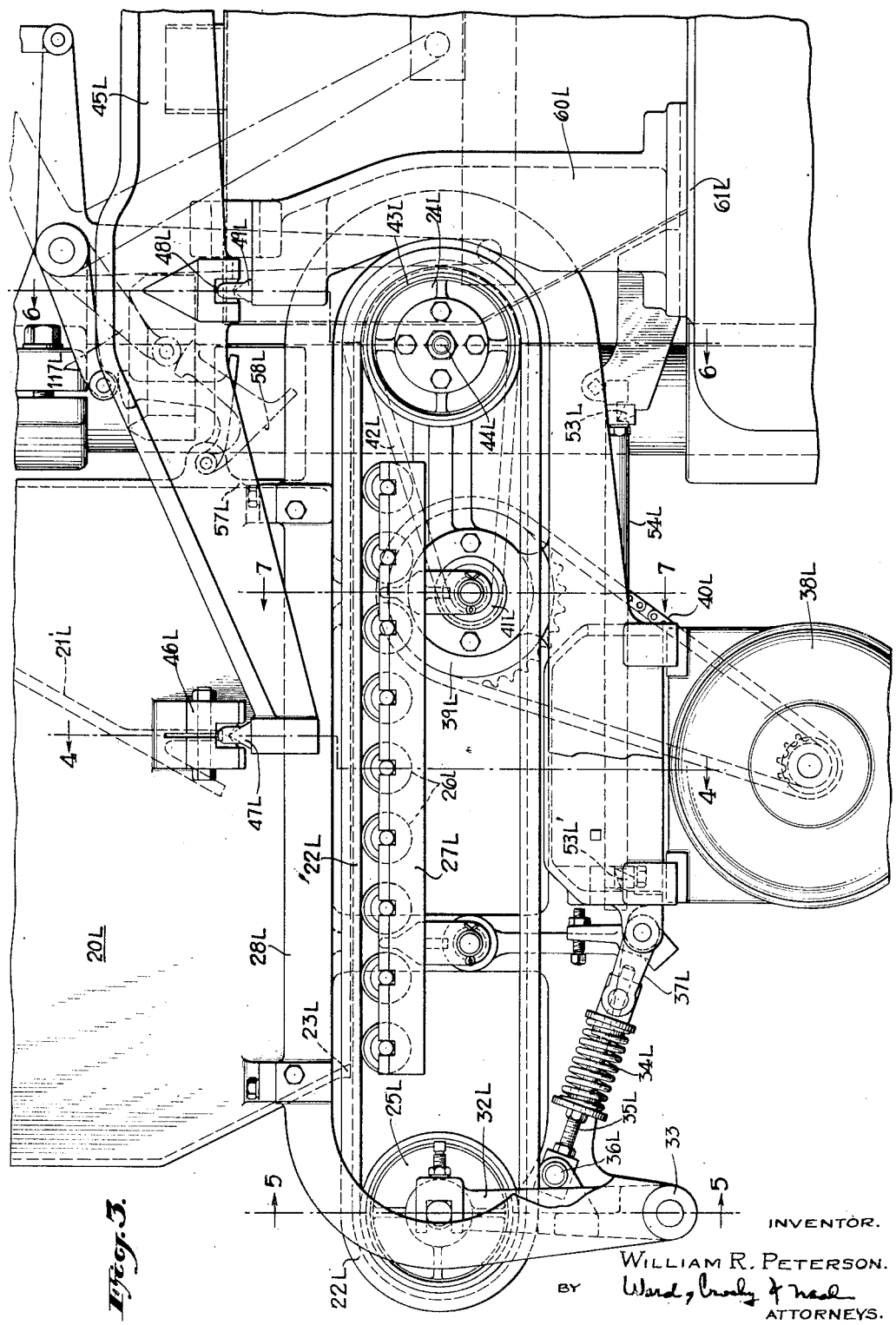

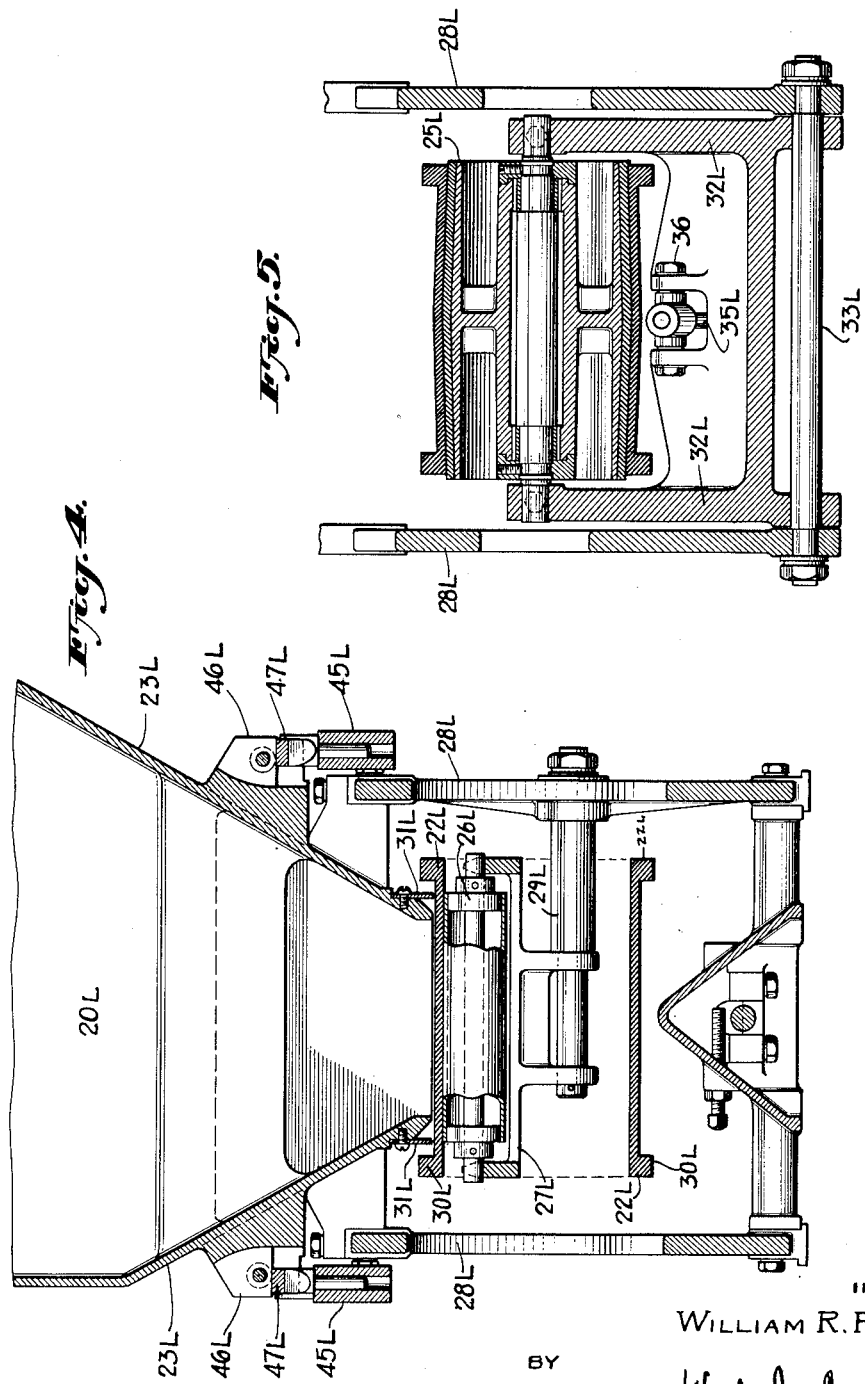

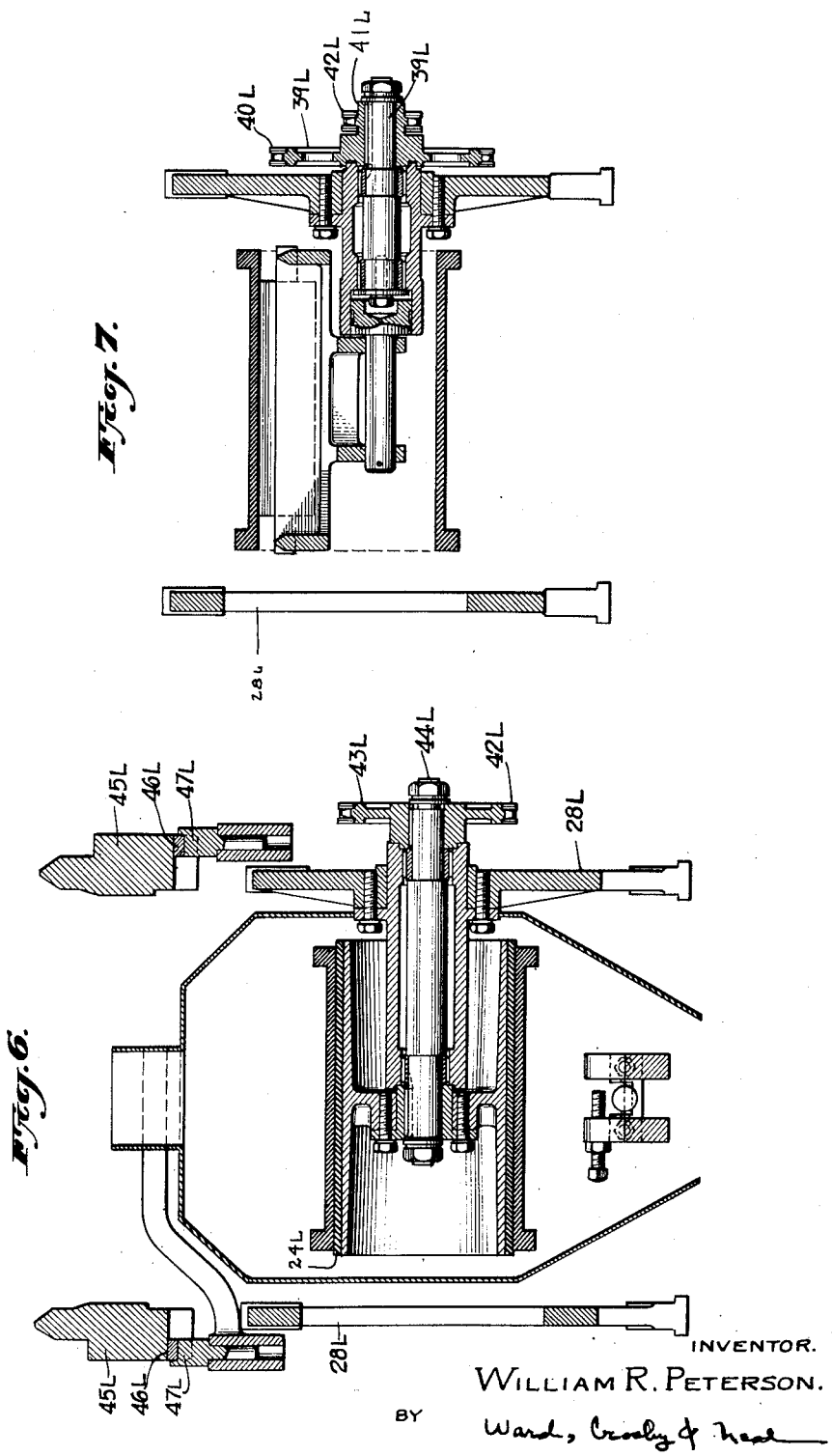

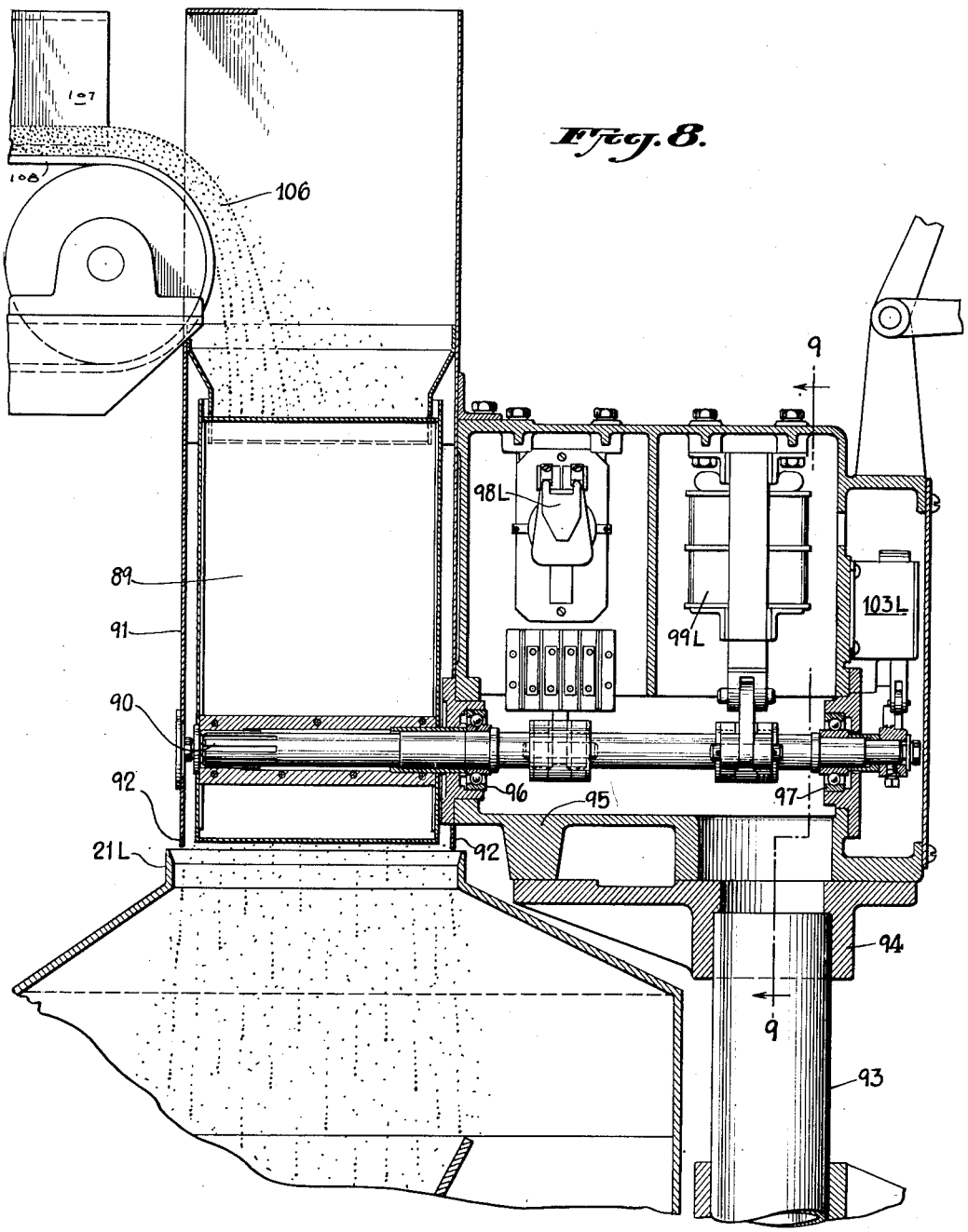

Aug. 5, 1952 W. R. PETERSON 2,605,990
APPARATUS FOR FILLING VALVE BAGS
Filed Sept. 12, 1946 7 Sheets-Sheet 7
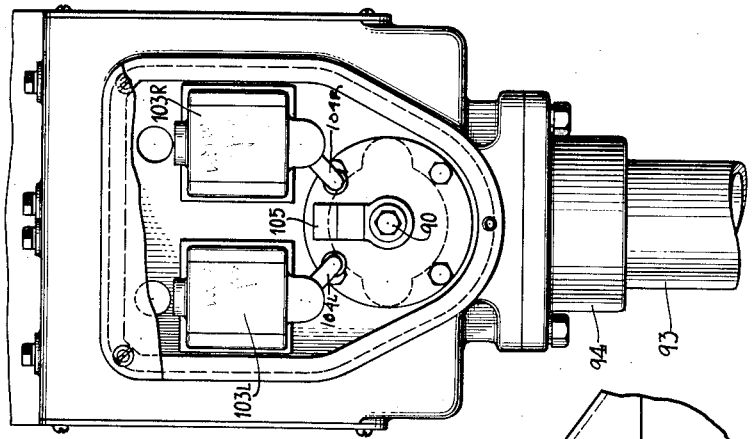
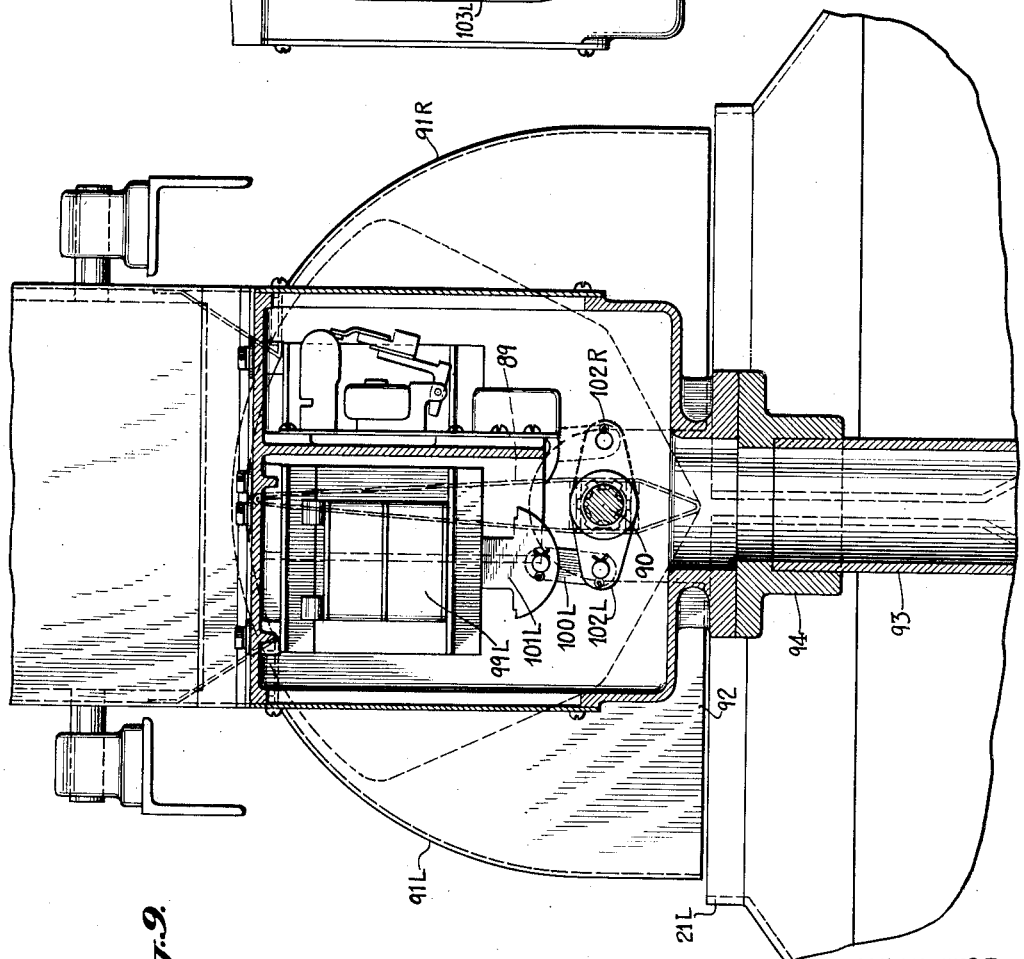
INVENTOR.
WILLIAM R. PETERSON.
BY Ward, Crosby & Neal
ATTORNEYS.

Patented Aug. 5, 1952

2,605,990

UNITED STATES PATENT OFFICE 2,605,990

APPARATUS FOR FILLING VALVE BAGS

William R. Peterson, Oswego, N. Y., assignor to St. Regis Paper Company, New York, N. Y., a corporation of New York Application September 12, 1946, Serial No. 696,397

3 Claims. (Cl. 249—17)

This invention relates to apparatus for filling containers, and more particularly to apparatus for automatically weighing a charge of material for a valved bag and for feeding such a weighed charge into the bag through said valve.

In bag filling machines heretofore proposed which have preweighed charges for the bag and thereafter automatically fed same to the bag, many hand operations have been necessary. The apparatus of the present invention reduces these hand operations to a minimum and increases the speed of operation to a heretofore unattained level in machines of this type.

In certain types of preweighing bag filling machines previously employed the speed of operation has been limited by the use of a single scale for weighing a charge and by sometimes inadequate means for conveying the weighed charge to the bag.

Furthermore bag filling machines previously suggested, which are of the charge preweighing type, have employed weigh hoppers with various means for conveying the preweighed charge to a filling unit which moves same into a bag. Such means have, in the past, produced undesirable delays and have constituted the main "bottle-neck" in the filling operation.

Also in apparatus of this type heretofore proposed there have been intermittent interruptions of a main flow of material from a supply bin. Such interruptions of material flow may result in appreciable reduction in operating speed and in lower output of filled bags per unit of time.

According to the present invention, an apparatus for preweighing a charge for a bag and conveying same rapidly into the bag is provided which will eliminate the above noted difficulties.

Various further and more specific objects, features and advantages of the invention will clearly appear from the detailed description given below taken in connection with the accompanying drawings which form a part of this specification and illustrate, by way of example, preferred arrangements of apparatus for carrying out the invention. The invention consists in such novel combinations of features as may be shown and described in connection with the equipment herein disclosed.

In the drawings:

Fig. 3 is a detailed view of a scale or weigh hopper employed in the present invention;

Fig. 4 is a view partly in section and with parts broken away taken on line 4—4 of Fig. 3;

Fig. 5 is a sectional view taken on line 5—5 of Fig. 3;

Fig. 6 is a sectional view taken on line 6—6 of Fig. 3;

Fig. 7 is a sectional view taken on line 7—7 of Fig. 3;

Fig. 8 is a side elevation partly in section and with parts broken away of a material flow deflector and related control devices;

Fig. 9 is a sectional view taken on line 9—9 of Fig. 8; and

Fig. 10 is a front elevation partly in section of a portion of the apparatus shown in Fig. 8.

Figure 1:
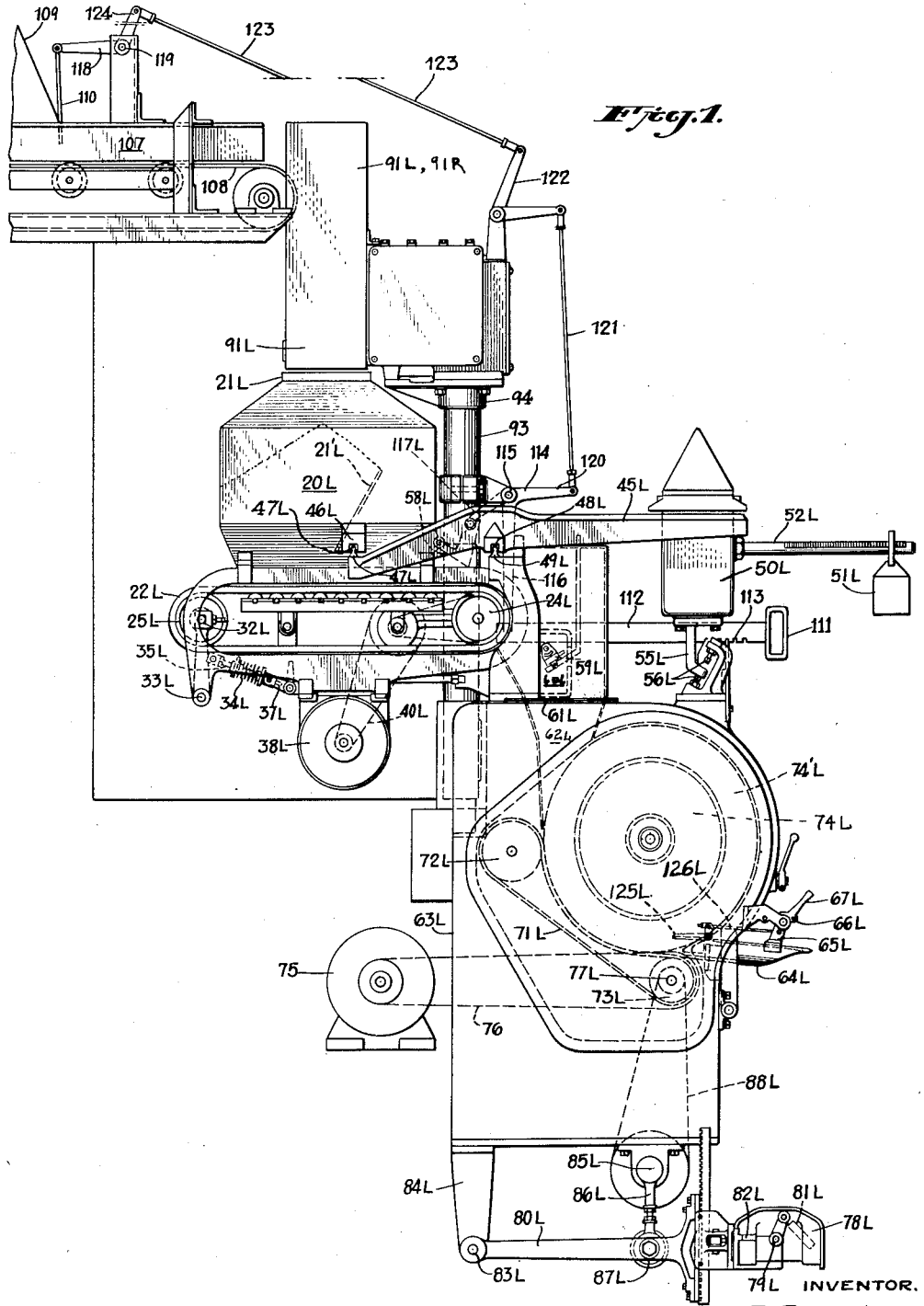
Fig. 1 is a side elevation partly in section and with parts broken away of one embodiment of the invention.

The operation of the apparatus will first be described in general terms after which a detailed description will follow.

The novel apparatus broadly is constituted by two separate scale or weigh hoppers, and two separate filling units or packers each packer having a valve bag filling tube and a conveyor for moving material at high speed into its tube after the material has been weighed in its respective weigh or scale hopper.

A continuous stream of material is fed to this apparatus by means of a main supply conveyor, and this continuous stream is alternately directed to one or the other of the above mentioned scale hoppers.

Material is fed in a continuous stream from a main supply hopper by said main supply conveyor to a deflector unit which is adapted for directing material alternately to said scale hoppers one at a time. Endless conveyor belts or scale conveyors are mounted one in the bottom of each scale hopper, which belts constitute the bottom of their respective hoppers and are adapted when moved for emptying said respective hoppers by a pouring action into a bag filling unit. This pouring action constitutes an important feature of the invention, and results in an unexpectedly high bag filling rate and in unexpected efficiency of the filling operation as a whole. When the deflector unit is directed toward the left hopper the latter becomes filled and undergoes a weighing movement. In response to this movement the deflector is immediately shifted to cut off material flow to the filled hopper, and to direct material to the right hopper. This shifting of the deflector may be accomplished through the intermediary of, for example, a mercury switch and solenoid arrangement.

In response to the movement of the deflector, which shuts off material flow to the left hopper and starts it to the right hopper, the following occurs in the order named:

(1) A motor for moving the right scale conveyor is stopped to permit the weighing of a charge in the right hopper;

(2) A left bag clamp on the left filling tube is moved into clamping action in order to hold the left bag firmly on the left tube during the filling thereof;

(3) A left scale conveyor motor is started. This occurs preferably after the deflector has completed its movement. The left scale conveyor conveys the material in the left hopper to a packer unit, for example, a left feeder belt and centrifugal pulley device which forces the material at high speed into the bag through the filling tube. The left bag thus is filled with an accurately weighed charge. The scale conveyor pours material into the filling unit or packer at a faster rate than can be attained by any known means especially with respect to certain types of material such as fertilizer.

(4) A right bag clamp is lifted simultaneously with the starting of the left scale conveyor motor. At this point no bag is on the right tube. However, one can now be inserted.

The filling of the left bag and the filling of the right scale hopper occur partially concurrently in that they commence at the same time, but the filling of the bag is completed prior to the completion of a weighing action in the right scale hopper.

As above mentioned, the shifting of the deflector to the right hopper and stopping of the right scale conveyor motor permits a filling of the right scale hopper and the weighing of a charge therein. Material is thus fed to the right hopper until a weight is counterbalanced and weighing movement occurs.

In response to this weighing movement the deflector is immediately shifted back to the position originally mentioned above, that is, it is shifted to cut off material flow to the right hopper and to direct it to the left hopper. This shifting also may be accomplished, for example, through the intermediary of a mercury switch and a solenoid arrangement.

In response to deflector movement to the left hopper, which thus shuts off material flow to the right hopper, the following occurs:

(1) The left scale conveyor motor is stopped to permit the filling of this hopper and the weighing of a charge therein;

(2) The right bag clamp is moved into clamping action with the right tube thereby firmly holding the right bag on the tube during the filling thereof;

(3) The right scale conveyor motor is started preferably after the deflector has reached the limit of its motion. The right scale conveyor pours material to a right feeder belt and centrifugal pulley arrangement which immediately moves the material into the right bag which thus is filled with a pre-weighed charge;

(4) As above set forth, the left bag has been filled. The left bag clamp now is lifted preferably simultaneously with the starting of the right scale conveyor motor.

The bags are held on the above mentioned filling tubes by means of a suitable bag saddle which normally is jigged or oscillated to settle material in the bag. The bag saddle is so constructed and arranged that when the bag clamp is lifted, the bag saddle will pivot automatically under the influence of gravity and the bag will be discharged from the apparatus. In order to facilitate this discharge the filling tubes preferably are tilted downwardly so that the bags may slide easily therefrom when the bag clamp is lifted. Thus, when the left bag clamp is lifted, the left bag is automatically discharged by the combined action of:

(a) Gravity (the saddle may be pivoted to the left of the center of gravity as viewed in Fig. 1 and the spout is tilted downwardly);

(b) The jiggling or oscillating action of the bag saddle.

Thus there is a delayed discharge of the bag which permits the excess air pressure to dissipate and thus avoids "blowbacks" or puffs of dust-laden air. The period of delay is brought about by the fact that, for example, the left bag is completely filled before the weighing action of the right weigh hopper. An analogous delayed discharge will take place for the right bag.

Referring to the drawings in further detail, the apparatus comprises twin weighing and filling machines to which a flow of material is fed alternately to one and then to the other. In the description, the letter "L" following a number designates a part of the left hand weighing and filling machine as viewed in Fig. 2, and the letter "R" designates a part of the right hand machine. If no letter is shown after a number, it indicates that only a single part is employed rather than a pair of parts.

As above mentioned, the apparatus broadly comprises two identical weighing and filling units which are disposed side by side and to which a continuous flow of material is directed first to one weighing and filling unit and then to the other. In this description, the left hand weighing and filling unit only will be described in detail.

WEIGH OR SCALE HOPPER

The left hand weighing unit is constituted by a novel scale or weigh hopper 20L comprising a chamber for holding material which is to be weighed and is provided preferably with an upper restricted neck portion 21L which is adapted for registering with a material flow deflector unit which will appear hereinafter. A baffle 21'L, preferably slanted to direct inflowing material to the left as viewed in Fig. 1, may be provided for directing material flow to the rear of the hopper and for preventing the escape of material through an outlet of the hopper in a manner to appear later.

In order to provide heretofore unattained speed in the emptying of a weigh hopper and thus in order to achieve new and higher rates of bags filled per unit time, novel means are provided for emptying the scale hopper comprising a conveyor belt 22L which forms the bottom or floor of the hopper as shown in detail in Fig. 4. The sides of the hopper 20L preferably act as a funnel to direct material toward said floor. The slanting or tilted sides of the hopper 20L are indicated in Fig. 4.

The conveyor belt 22L is an endless belt mounted upon end pulleys 24L and 25L. That portion of the endless belt which is adjacent the hopper, that is, that portion which constitutes the floor of the hopper, rests upon suitable idler rollers 26L which support the belt in such a manner that it may take the full weight of a charge in the hopper. As shown in detail in Fig. 4, the rollers may rest in a suitable support 27L which is mounted upon a conveyor frame 28L by means of arms 29L.

Novel means are provided for preventing a leakage of material from the hopper adjacent the belt comprising a peripheral flange 30L on the belt which, as shown in Fig. 4, extends upwardly with respect to that portion of the belt adjacent the hopper and which forms a shoulder for retaining any material which might leak or flow from the hopper onto the margin of the belt. Additional means are provided for forming a spillproof association between the belt and hopper comprising hopper stream guards 31L which are rigidly attached to the lower lip of the hopper 20L and which extend to a position preferably only a fraction of an inch from the belt. The hopper stream guards are attached only to that portion of said lip which is parallel to the longitudinal axis of the belt.

In order to maintain a proper tension on the belt 22L, resilient means are provided for urging one of the end supporting pulleys in such a direction that the belt is drawn taut by a desired amount. These means comprise, in the form shown in Figs. 1, 3 and 5, a forked arm 32L which supports at one extremity thereof the roller 25L and which is pivoted at the other extremity upon a shaft 33L which is fixed to the conveyor frame 28L. The arm 32L is urged in a counterclockwise direction as viewed in Figs. 1 and 3 by means, for example, of an extensor spring 34L which is associated with an arm 32L by means of an adjustable threaded arm 35L pivoted thereto at 36L (Fig. 3) and which is associated with the fixed conveyor frame 28L by means of an analogous member 37L.

Means for actuating the conveyor are provided comprising a motor 38L which is rigidly fixed to the conveyor frame 28L and operatively associated with the conveyor by means, for example, of a suitable sprocket wheel or chain. The motor 38L may be connected to a suitable sprocket 39L by means of a sprocket chain 40L (Figs 1 and 7). Sprocket 39L may be mounted upon a shaft 39'L and operatively connected to the conveyor belt 22L by means of a sprocket wheel 41L integral therewith and a sprocket chain 42L which engages another sprocket wheel 43L (Figs. 3 and 6). The latter is adapted for rotating the conveyor belt and is rigidly attached (Fig. 6) to a shaft 44L of the conveyor belt pulley 24L.

In order that a full charge for a bag may be preweighed before it is fed into the bag, the entire scale hopper 20L including all of the parts above described in connection therewith are mounted upon a suitable scale beam 45L by means of conventional knife edges. A pair of knife edge grooves 46L (Fig. 4) are rigidly mounted upon the scale hopper 20L and adapted for being supported by cooperating knife edges 47L which are preferably integral with one extremity of the scale beam 45L (Fig. 4). Scale beam 45L is supported intermediate the extremities thereof by means of a second set of knife edges (Figs. 1 and 3) comprising grooves 48L which are supported on knife edges 49L. A suitable weight or counterweight 50L is mounted by conventional means upon the extremity of the scale beam opposite to that of the scale hopper. In order to obtain a fine weight adjustment, it is desirable to provide a small poise weight 51L which is axially shiftable relative to the scale beam upon an arm 52L which may be rigidly attached to beam 45L and which extends beyond the weight 50L as shown in Fig. 1.

The entire hopper and conveyor assembly are fastened rigidly together to form a scale bucket or scale hopper.

The scale hopper as above described normally would be able to tilt angularly about the knife edges 47L if it were not for suitable restraining means which do not impede the weighing action of the scale but which prevent said tilting of the scale hopper. Said restraining means comprise a knife edge 53L fixedly mounted on the frame of the filling apparatus and a knife edge 53L' fixedly attached to the scale hopper unit. The knife edge 53L' is urged to move toward the knife edge 53L because the center of gravity of the scale hopper is at the left of the scale knife edge 47L as viewed in Fig. 3. The check rod 54L is interposed between the said knife edges 53L and 53L' in order to maintain a proper spaced relationship therebetween. Said check rod constitutes the lower arm of a parallelogram formed between the knife edges 47L, 49L, 53L and 53L'.

The check rod 54L in cooperation with said knife edges thus prevents angular movement of the scale hopper about the knife edges 47L and thus prevents the restricted neck 21L of the hopper 20L from moving out of register with the deflector unit (Fig. 8) to be described hereinafter.

The weighing movement of the scale beam 45L and the apparatus mounted thereon is restricted by a limit stop as shown in Fig. 1 consisting, for example, of an arm 55L rigidly attached to weight 50L which is adapted for movement between suitable adjustable limit stops 56L.

As shown in Fig. 3 the left wall 23L of the hopper 20L extends downwardly to a point a fraction of an inch above the movable conveyor belt whereby little or no spillage will occur through this slight clearance. The upper surface of the scale conveyor or conveyor belt (as shown in Fig. 3) is adapted for movement to the right and thus may carry the contents of the hopper 20L through an opening 57L which is controlled by a scale hopper gate 58L. The latter may be controlled by means of a linkage to be described hereinafter.

In order to control the position of a material flow deflector unit, to be described hereinafter, in response to weighing movement of the weighing device above described, suitable means are provided for opening and closing an electric circuit in response to said weighing movement. Said means comprise, in the form shown, a mercury switch 59L (Fig. 1) which is operatively associated with said deflector unit in a manner to appear more fully later.

PACKER UNIT

The weigh hopper above described is positioned above a packer unit and the scale conveyor or belt is adapted for conducting material through the opening 57L (Fig. 3) into a duct or conduit 60L which is positioned above and in register with an opening 61L in a packer hopper 62L. The hopper 62L may be mounted within a packer housing 63L which may be fixedly mounted upon a suitable foundation.

Upon the housing 63L there is rigidly mounted a suitable valve bag filling tube 64L which preferably is tilted downwardly at an angle of a few degrees, for example, 4 to 8 degrees, whereby a bag may slide from said tube in a manner to appear later. Cooperating with the tube 64L for retaining a bag thereupon is a bag clamp 65L which is pivotally mounted upon a shaft 66L. The bag clamp 65L may be manually shifted into and out of clamping engagement with the tube 64L by means of a handle 67L. Suitable automatic means are also provided for controlling the bag clamp comprising a solenoid 68L (Fig. 2) which is operatively interconnected thereto by means of a rod 69L which is axially shiftable by the solenoid 68L and is connected at one extremity thereof to an arm 70L which is rigidly attached to bag clamp shaft 66L. When the solenoid 68L is, for example, deenergized, the force of gravity will pull the rod 69L downwardly to shift the shaft 66L in a counterclockwise direction as viewed in Fig. 1, thereby closing the bag clamp 65L. Energization of solenoid 68L produces an upward thrust upon the rod 69L which communicates an opposite angular movement to shaft 66L, thereby lifting the clamp.

Material is rapidly conveyed through packer hopper 62L into a bag on the tube 64L by means of a feeder belt and centrifugal pulley arrangement. Said arrangement comprises a conveyor belt 71L (Fig. 1) which is mounted upon suitable pulleys 72L and 73L (Fig. 1). The latter pulley is disposed adjacent the filling tube 64L in such a manner that the latter is substantially tangent to this pulley.

In order to obtain a rapid discharge of material on the belt 71L into the tube 64L, considerable slack is permitted in said belt which is taken up by a centrifugal pulley 74L. This pulley may be provided with a groove 74'L on the periphery thereof. When the pulley 74L is rotated in a counterclockwise direction as shown in Fig. 1, material in the hopper 62L is rapidly moved over the conveyor belt 71L and shot through the tube 64L.

Means are provided for rotating a feeder belt pulley and thus moving the feeder belt comprising an electric motor 75 which, by means of a chain or belt 76, drives a suitable sprocket which is attached to a shaft 77L on which the pulley 73L is mounted.

The motor 75 may drive the left centrifugal pulley and feeder belt arrangement and simultaneously may drive an analogous device in the right hand weighing and filling unit. This may be accomplished by a suitable interconnection between the shafts 77L and 77R.

Means are provided for holding a bag in filling relationship to the spout 64L in combination with the above mentioned clamp 65L, and for jigging or oscillating the bag, comprising a bag saddle 78L which is pivotally mounted at 79L to a settler lever 80L. The pivot 79L for the bag saddle 78L is disposed to the left of the center of gravity of the bag saddle as viewed in Fig. 1 whereby gravity urges the bag saddle toward a tilting or bag discharge position. Resilient means are employed for urging the bag saddle 78L into a normal position whereby a bag may be held in filling position upon the spout 64L. Said resilient means comprise, in the form shown, a spring 81L (Fig. 1) which is attached at one extremity to the settler lever 80L and at the other extremity to the bag saddle 78L in such a manner that the bag saddle is held in its normal untilted position against a suitable limit stop 82L.

The settler lever 80L may be pivotally mounted at 83L upon a suitable fixed arm 84L which may be rigidly attached to the housing 63L.

The settler lever may be oscillated by means of a suitable eccentric 85L which is in operative association with the settler lever 80L by means of an eccentric rod 86L which is in pivotal association with said settler lever at 87L. The eccentric 85L may be rapidly rotated by means of the motor 75 and may be operatively interconnected therewith by a suitable chain or belt 88L which may pass over suitable pulleys upon the shaft 77L and upon the shaft of eccentric 85L.

In order to minimize vibration which might affect weighing accuracy, suitable rubber journals or bushings may be provided for pivots 83 and 87. Much of the vibration that would normally be transmitted to the frame of the machine may be eliminated. Such rubber bushings will also reduce the wear on the parts so provided and may eliminate greasing the settler unit lever.

The bag saddle spring 81L is of sufficient strength to hold the bag saddle in a normal untilted position before a bag is completely filled and before the bag clamp 65L is lifted. If said bag clamp is lifted when there is appreciable material in a bag, the combined action of gravity plus the jigging or settling action of lever 80L will cause the bag saddle 78L to tilt and discharge the bag. The bag which is clamped on tube 64L, and which is undergoing the jigging or oscillating action of the settling device, tends to "walk" to the right as viewed in Fig. 1 or outwardly and thus tends to facilitate bag discharge. The fact that the bag saddle is oscillating continuously and is mounted higher than the settler lever pivot at 83L tends to cause the "walking" to the right.

Figure 2:
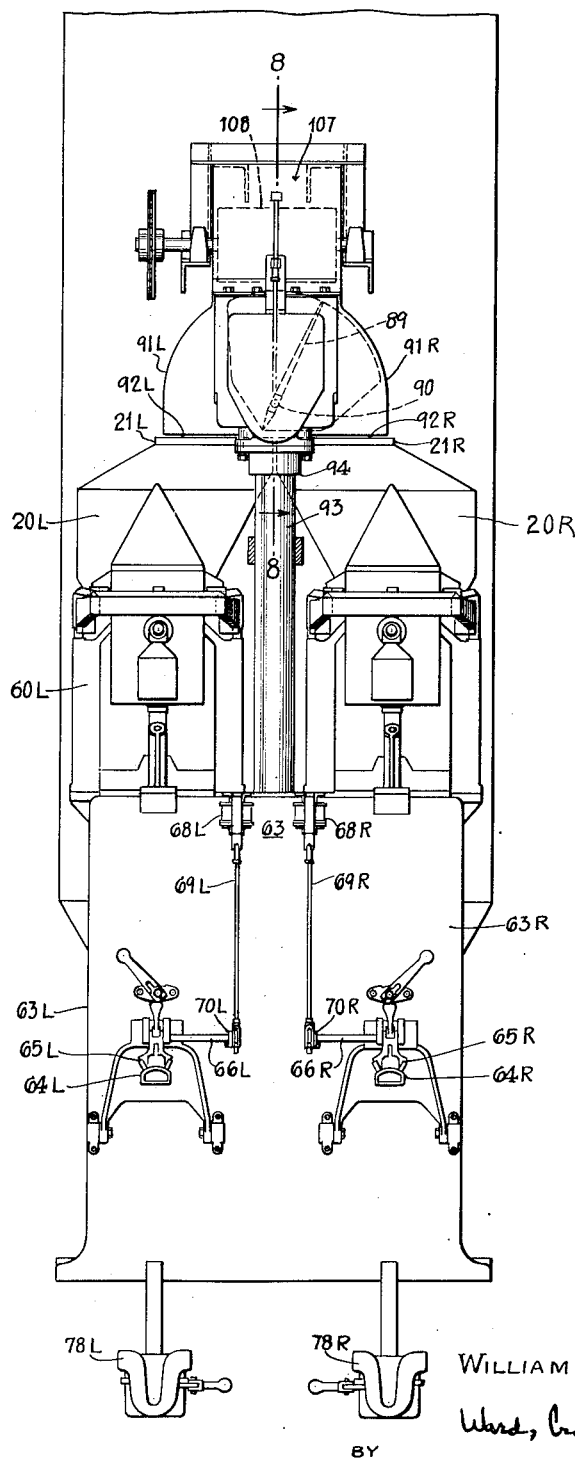
Fig. 2 is a front elevation of the embodiment shown in Fig. 1.

A filling unit identical to the one described above is symmetrically disposed to the right of a center line as viewed in Fig. 2. The right hand filling unit has parts numbered similarly to the parts above described with the exception that the suffix "R" is attached to the numeral designation instead of the suffix "L."

DEFLECTOR UNIT

The above discussed deflector unit which acts to divert a flow of material alternately to the right and left scale hoppers is constituted by a fin 89 which is rigidly attached to a shaft 90 which is disposed centrally of and above the hoppers 20L and 20R. The deflector 89 is within a suitable housing 91L, 91R (Figs. 1, 2 and 8). The housing 91L has a lower lip 92L which forms a throat or orifice which is adapted for registering with the hopper throat 21L (Figs. 1 and 2). Lower lip 92L may be surrounded by the upper periphery of neck 21L when the scale hopper is empty and during the filling thereof. However, hopper neck 21L may undergo a weighing movement downwardly as viewed in Figs. 1, 2 and 8 whereby the neck 21L is moved out of a surrounding relationship with lip 92L and is pulled to a position below said lip.

An analogous relationship between deflector housing 91R and hopper 20R exists wherein a neck 21R moves relative to a lower deflector housing lip 92R.

The deflector shaft and the control apparatus therefor are preferably mounted upon a central supporting column 93 which is rigidly supported in the housing 63 at the lower extremity thereof. At the upper extremity of column 93 there may be a support collar 94 on which is mounted (Fig. 8) a housing bed plate 95 which supports suitable bearings 96 and 97 for the shaft 90.

In order to control the angular position of the deflector 89 in response to the completion of the filling of a scale hopper, a pair of relays 98L, 98R and a pair of deflector solenoids 99L and 99R are provided.

The solenoid 99R is operatively associated with the mercury switch 59L through the intermediary of the relay 98L. That is, when the normally open mercury switch 59L is closed in response to weighing movement of the scale hopper 20L, the relay 98R is actuated, thereby energizing the solenoid 99R.

The mercury switch 59R is analogously associated with the relay 98L and the solenoid 99L whereby said mercury switch 59R, which is normally opened, is closed in response to weighing movement of the scale hopper 20R and energizes the solenoid 99L through the intermediary of the relay 98L.

Solenoid 99L is adapted for angularly shifting the shaft 90 and the deflector 89 by means of a suitable connection comprising a link 100L (Fig. 9) which interconnects solenoid plunger 101L to an arm 102L which is rigidly attached, for example, by splines, to the shaft 90. The link 100L may be in pivotal association with plunger 101L and arm 102L by means of suitable pivot pins (Fig. 9).

An analogous connection exists between solenoid 99R and arm 102R (Fig. 9).

Thus, before scale hopper 20L is filled by a predetermined weight, the mercury switch 59L (Fig. 1) is open. But it can be closed in response to a weighing movement of the scale hopper 20L, at which time the solenoid 99R is energized and plunger 101R is pulled upwardly, thereby angularly shifting the shaft 90 and the deflector 89 to cut off the flow of material to the scale hopper 20L and to direct same to scale hopper 20R.

When a scale hopper has become full and a flow of material has been cut off therefrom and directed to the other scale hopper, it is necessary to empty the full scale hopper and to place the other one in a condition to receive a charge. Also it is necessary preferably at this point to actuate the bag clamp of that filling unit having a full scale hopper because the material in the full scale hopper will be fed into a bag held upon the respective filling tube.

It is also desirable at this point to release or lift the bag clamp of that filling unit, the scale hopper of which is being filled. This permits the ejection of discharge of a bag which has just been filled.

Suitable means are provided for governing the sale conveyor motors and the bag clamps in response to angular movement of the deflector 89, and hence in response to weighing movement of a scale hopper comprising a limit switch 103L (Fig. 10) and a similar switch 103R which are respectively provided with switch actuating arms 104L and 104R. These switches are normally open. They are operatively associated with the deflector 89 by means of a limit switch lever 105 which is rigidly attached to and angularly shiftable with the shaft 90. The limit switch lever 105, as shown in Fig. 10, is adapted for closing the switch 103R when it is at its right hand limit of angular motion and for closing the switch 103L when it is at its left hand limit of angular motion. These limits of angular motion correspond to the right and left limits of angular motion of the deflector 89. Consequently, when the deflector 89 is at its clockwise limit of motion, as shown in dotted lines in Fig. 2, the lever 105 will bear against the switch actuating arm 104R and will close this switch. Analogous results occur when the deflector 89 is shifted to its counterclockwise limit of angular motion whereupon switch 103L is closed.

The switch 103R controls the energization of the scale conveyor motor 38R and bag clamp solenoid 68L. When this switch is closed: (1) the scale conveyor motor 38R is energized and will empty the scale hopper 20R; and (2) the bag clamp solenoid 68L is energized, thereby lifting the bag clamp 65L.

An analogous control by switch 103L is exercised over scale conveyor motor 38L and bag clamp solenoid 68R. Consequently when the switch lever 105 reaches the end of its counterclockwise motion, it strikes the switch actuating arm 104L. Thus the bag clamp solenoid 68R is energized and the bag clamp 65R is lifted. Simultaneously, the switch 103L, now closed, starts the motor 38L whereby the hopper 20L is emptied of its charge.

The above mentioned control devices, that is, the relays 98L, 98R, the solenoids 99L, 99R, and the limit switches 103L, 103R and the parts related thereto, as above mentioned, are preferably mounted in a housing which is adjacent the deflector unit, and mounted upon the vertical supporting column 93 as shown in Figs. 1, 2 and 8. These control devices and the deflector unit are thus fixedly mounted and do not, of course, participate in any movement of the scale hoppers 20L and 20R.

MAIN SUPPLY CONVEYOR

It has been mentioned in several instances above that there is fed to the deflector unit a substantially uniform stream of material which is in turn fed to the scale hoppers. This substantially uniform stream is indicated in Fig. 8 by the numeral 106 and flows from a conveyor unit 107 which is designated as the main supply conveyor which forms a part of a main supply unit.

The main supply unit is constituted by a conveyor belt 108 which may be mounted upon suitable rollers. This belt preferably comprises the bottom of a main supply hopper 109 (Fig. 1). Suitable power means (not shown) may be provided for actuating the main supply conveyor.

As is shown in detail in Figs. 1 and 8, the discharging extremity of the main supply conveyor belt 108 is positioned partially within the housing 91 of the deflector unit, and, of course, it is positioned above the deflector 89 whereby angular movement of the deflector (from one extremity of its motion to the other) can shift a flow of material from one hopper to the other.

Means are provided for regulating from a single point of control the depth or height of the main steam of material, that is, the stream which pours from the main conveyor 107, and for simultaneously regulating the height or depth of the streams of material which may pour from both of the weigh hoppers. Such a regulation is necessary in order to avoid a sudden glutting of the deflector unit and a glutting of the hopper of the packer unit. Such regulation also is necessary to facilitate the adjustment of bag filling rates and weigh or scale hopper filling rates.

The above mentioned stream regulating means is designated a gate control means and constitutes, in the form shown, a linkage for controlling the position of a main supply gate 110 and of the scale hopper gates 58L and 58R. Said linkage comprises a handle 111 which is conveniently placed in the front of the apparatus upon an axially shiftable rod 112 having suitable adjustment notches 113 therein. Rod 112 is adapted for angularly shifting a bell crank lever 114 which is pivotally mounted upon a shaft 115. Bell crank lever 114 is provided with a centrally disposed and preferably depending arm 116 which is pivotally connected to the axially shiftable arm 112. Lever arm 116 may be rigidly attached to the shaft 115 and adapted for simultaneously moving gate control arms 117L and 117R which act, for example, as limit stops for the motion of their respective scale hopper gates 58L and 58R. Normally the scale hopper gates 58L and 58R hang downwardly under their own weight, thereby closing their respective outlets. However, when a scale hopper has been filled and the scale conveyor thereof is actuated, a stream of material will pass through, for example, the aperture 57L (Fig. 3) and will swing the gate 58L about its pivot in a counterclockwise direction until the gate strikes against the gate control arm or limit stop 117L. The angular position of the gate 58L thus will determine the depth of the stream of material which is moved out of the scale hopper.

Adjustment of the main supply gate 110 is accomplished by communicating the angular movement of shaft 115 to a lever 118 which may be pivoted at 119 and may support at the opposite extremity thereof the gate 110 by means of a suitable pivotal connection. The linkage for communicating the angular motion of shaft 115, and thus for communicating the adjustment of rod 112, to the gate 110 comprises a lever arm 120 which may be integral with the arm 116. A rod 121 pivotally attached to the lever 120 communicates the motion thereof to a crank lever 122 which in turn is interconnected by a rod 123 to an arm 124. The latter may be rigidly attached to the arms 118.

Thus an axial movement of the rod 112 into any desired adjusted position will be communicated simultaneously to the gate control arms 117L, 117R and to gate 110. It is desirable that the portions of the gates 58L, 58R which contact control arms 117L and 117R be in the form of cams whereby equal increments of vertical adjustment of the gate may be obtained by equal angular increments of motion of the respective gate control arms.

DUST AND SPILL CONTROL

In order to control dust which may occur as a result of the pouring of streams of material into said hoppers it is possible to enclose the entire unit, that is, the packer, weigh hopper, deflector, and main supply conveyor in a dustproof housing. The main frame of the apparatus may be so cast that spill from the back of the filling tubes and from the centrifugal pulleys may be removed from the bottom thereof.

Dust that might ordinarily issue from a filling tube when there is no bag thereon and when the centrifugal pulley is running may be deflected upwardly by means of a pivoted dust deflector 125L which may be operatively connected to bag clamp 65L by a rod 126L in such a manner that when the bag clamp is lifted the dust deflector is lowered to cover the opening of the tube 64L.

OPERATION

Initial conditions of operation

In operation, certain initial conditions obtain as follows:

(1) The centrifugal pulleys 74 and feeder belts 71 associated therewith preferably are driven continuously by the motor 75;

(2) The bag settler also is continuously driven by said motor;

(3) The right scale conveyor 22R is running; that is, it is actuated by its respective motor 38R;

(4) The left scale conveyor 22L is stopped; thus motor 38L is temporarily not in operation;

(5) An empty bag is mounted upon the left filling tube 64L and the bag clamp 65L is lifted;

(6) No bag is inserted upon the right filling tube 64R at this time;

(7) The deflector 89 is directed toward the left hopper as shown in Fig. 2;

(8) The main supply conveyor 107 is stationary.

Starting of the apparatus

The main supply conveyor may be started by closing a suitable electric switch (not shown) which energizes the power means of the main supply conveyor and thus starts a flow of material from the main supply hopper 109 to the deflector unit. This flow is regulated in its depth by the position of the main supply gate 110.

Weighing of a charge by left scale hopper

A uniform stream of material 106 (Fig. 8) is directed by the deflector 89 into the baffled hopper 20L. The stream 106 (Fig. 8) is directed by means of baffle 21'L towards the rear of the scale conveyor 22L. The latter, as above mentioned, is stationary and thus permits the accumulation of a charge of material in the hopper 20L. At the outset of said filling of the left scale hopper, the weighted extremity of the scale beam 45L is in its lower position because the weight 50L overcomes the weight of the scale hopper. When a predetermined amount of material has been fed to the left scale hopper, it counterbalances the weight 50L and the scale hopper and scale beam and weight undergo a weighing movement, whereby the limit arm 55L (Fig. 1) may be moved from its lower to its upper limit stop. In response to this weighing movement, the normally opened mercury switch 59L is closed.

Operations initiated by left scale weighing movement

The closing of the mercury switch 59L in response to weighing movement of the left scale hopper has the following effects:

(1) The deflector 89 is shifted from the left to the right hopper. Thus the uniform stream of material is cut off from the left scale hopper and is directed to the right scale hopper. This is accomplished by energization of the deflector solenoid 99R through the intermediary of the relay 98R. When the deflector solenoid 99R is energized the plunger 101R thereof pulls up on lever 102R (Fig. 9) which is splined to the deflector shaft 90 and thus angularly shifts the deflector 89 in a counterclockwise direction so that the stream of material is directed to the right hopper as above mentioned.

In response to the deflector movement towards the right hopper, the following occurs in the order named:

(1) The right scale conveyor motor 38R is stopped to permit the accumulation of a charge in the right hopper 20R. This is accomplished by the angular movement of the switch lever 105 away from the switch actuating arm 104R. Immediately prior to the above described deflector movement the switch lever 105 had been at the clockwise limit of its motion whereby it had been thrust against switch lever arm 104R, thus closing the switch 103R. Normally switch 103R is open but the thrust of lever 105 had closed it. Lever 105 thus shifts angularly with the deflector 89 and its shaft 90 in a counterclockwise direction and moves out of contact with the switch actuating arm 104R. The opening of switch 103R is effective to stop the motor 38R and to deenergize the bag clamp solenoid 68L;

(2) As a result of deenergizing the left bag clamp solenoid 68L, the empty bag upon the tube 64L is clamped thereupon;

(3) The left scale conveyor motor 38L is started when the deflector has reached the counterclockwise limit of its angular motion, in order to empty the filled scale hopper 20L and to fill the bag upon the spout 64L. This is accomplished by the closing of the switch 103L as a result of switch lever 105 engaging and moving the switch actuating arm 104L which occurs when deflector 89 and shaft 90 have reached the end of their counterclockwise motion. A regulated and uniform stream of material thus is poured by means of the conveyor 22L into the packer which by means of the feeder belt and centrifugal pulley chutes the material through the tube 64L into the bag. The pouring action of the scale conveyor into the packer may be carefully controlled by governing the speed of the conveyor and the position of the gate 58L. The pouring action of the scale conveyor belts feeds material into the packer at rates hitherto unattainable. The stream may be attenuated and is in motion so that it passes the packer inlet, ordinarily the "bottleneck" in filling operations of this kind, at a velocity which is greater than that induced by normal gravity acting upon a charge in, for example, a dump-bottom hopper which may be fully openable. In such dump-bottom hoppers holding, for example, sticky material such as fertilizer, the material moves slowly when the bottom is opened. But under the action of the novel weight hopper and its conveyor herein disclosed the material moves rapidly, positively and uniformly, and avoids choking the packer unit or filling tube.

The avoidance of the choking of the packer unit or the filling tube, as is readily apparent and inherent in the drawings, particularly Fig. 1, is due to the greater linear speed of the belt 71L (and coacting grooved wheel 74L) as compared to the linear speed of the belt 22L of the scale hopper 20L. The above-mentioned stream attenuation (progressive reduction in cross sectional area) results from said greater linear speed of the belt 71L as compared to that of the belt 22L whereby such stream is reduced to the proper size for chuting at an extremely high rate through the filling tube 64L. The aforedescribed "uniform" characteristic of the stream of material mentioned above refers to the uniformity of the density of the stream as it is poured off of the belt 22L. Such uniformity and the geometrical configuration thereof enable the belt 71L and coacting wheel 74L to grasp the stream with a heretofore unattained efficiency and to attenuate same by virtue of the aforementioned higher speed of the belt 71L. The higher speed of the belt 71L, as compared to that of belt 22L, is readily apparent from "the gearing down" of the speed of the motor 38L (Figs. 1 and 3) and the absence of such "gearing down" as shown in Fig. 1 with respect to motor 75. For example, there is a one-to-one ratio between the output or drive gear (or wheel) of motor 75 and the input or drive gear (or wheel) of the belt 71L.

(4) At the same time that the scale conveyor motor 38L is energized, the right bag clamp 65R is lifted as a result of the closing of the switch 103L. This is accomplished by energizing the bag clamp solenoid 68R. At this point, no bag has been placed upon tube 65R but now an empty bag may be applied thereto.

*Weighing of the charge on right scale*

Simultaneous with the filling of the left hand bag through tube 64L, a stream of material is fed to the right hopper 20R in a fashion analogous to the feeding of the left hopper 20L above described. Thus there is a simultaneous filling and weighing action. However, the weighing of a charge in a hopper normally requires a longer period than the filling operation. Consequently the filling of the left bag is accomplished before the predetermined weight of material in scale hopper 20R moves the scale beam 45R.

When the predetermined amount of material has been fed to the right scale hopper a weighing movement occurs in the right hand weighing device and the scale hopper 20R moves downwardly. Thus the right hand mercury switch 59R is closed.

*Operations initiated by right scale weighing movement*

The weighing movement of the right weighing device has the following effects:

(1) The deflector is shifted clockwise back to its original position whereby a stream of material is directed to the left hopper. This is accomplished by the energization of the deflector solenoid 99L through the intermediary of the relay 98L. The solenoid plunger 101L (Fig. 9) pulls upwardly on the arm 102L and angularly shifts the deflector shaft 90 in a clockwise direction. A flow of material thus is immediately cut off from the right hopper and is directed to the left hopper. The latter as above mentioned has already been emptied by the scale conveyor. In response to the movement of the deflector to its clockwise position, the shaft 90 shifts the switch lever 105 from actuating contact with the arm 104L into actuating contact with the arm 104R (Fig. 10). Thus, the switch 103L is opened at the beginning of said angular motion of the deflector and the switch 103R is closed.

When the switch 103L is opened, the following occurs:

(1) The left scale hopper motor 38L is stopped to permit the accumulation of the charge in the left scale hopper;

(2) The right bag clamp is moved to a clamping position by the deenergization of the bag clamp solenoid 68R.

The closing of the switch 103R has the following effects:

(1) The right scale conveyor motor is started. This, of course, occurs after the deflector has reached its clockwise limit of motion. Thus a uniform stream of material is poured into the right packer hopper 62R and fed to the bag by means of the right feeder belt 71R and the right centrifugal pulley 74R (not shown).

(2) The left bag clamp 65L is now lifted as a result of the energization of the left bag clamp solenoid 68L.

Bag discharge

When the left bag clamp is lifted, the left bag is automatically discharged as a result of:

(1) The position of the bottom of the bag on the bag saddle. As above discussed, the jigging or settling action of the settler lever 80L in combination with the fact that the saddle is higher than the pivot point 83L produces a bag "walking" action in which the bag "walks" outwardly upon the saddle 78L.

A similar walking action occurs on the right hand bag saddle.

(2) The center of gravity of the bag saddle is at the right of the bag saddle pivot at 79L. Consequently, gravity is effective to tilt the bag saddle and discharge the bag against the action of spring 81L;

(3) The downward slope of the filling tube 64L assists the discharge of the bag under the influence of gravity;

(4) The continuous jigging or settling action also facilitates the discharge.

While the invention has been described above with reference to only two filling units (two weigh hoppers and their respective packers), it is of course possible to employ more than two filling units in cooperation with a suitable deflector unit for directing a flow of material to any selected filling unit.

While the invention has been described with respect to a preferred embodiment, it will be understood by those skilled in the art after understanding the invention that various changes and modifications may be made without departing from the spirit and scope of the invention, and it is intended therefore in the appended claims to cover all such changes and modifications.

What is claimed as new and desired to be secured by Letters Patent is:

1. In a valve bag filling machine, a valve bag packer unit including: a peripherally grooved wheel mounted for rotation upon a substantially horizontal axis, a belt, means for moving the belt through a closed path including a path coming into contact with a portion of the periphery of said wheel and running from an upper position downward around said portion to a lower position and thence onward tangentially of the wheel, said tangential direction being substantially horizontal, said belt forming a channel with the groove in said wheel, and a filling tube for entering the valve of a valve bag, such tube being positioned to receive material discharged from said belt in such tangential or substantially horizontal direction; a weigh hopper; a hopper endless conveyor belt, a portion thereof comprising the bottom of such hopper; means for mounting said endless belt for movement of such portion comprising the hopper bottom in substantially a horizontal direction; a region of said hopper adjacent such belt portion having a passageway therethrough above such belt portion, such passageway being formed to impart a ribbon-like configuration to material discharged from such hopper through such passageway under the influence of the motion of said endless belt, said weigh hopper being positioned above said upper position of said belt for discharging the ribbon-like stream of material therefrom into the channel formed by said belt and peripherally grooved wheel, and means for driving said packer unit grooved wheel and belt at a greater linear speed, as measured at said belt, than the linear speed of said hopper endless conveyor belt.

2. In apparatus for filling valve bags, a valve bag packer unit including: members forming together the walls of a channel, said channel having input and discharge extremities, means for mounting said members for moving all of the walls of said channel about a common axis, and a valve bag filling spout in alignment with the discharge extremity of said channel; a weigh hopper; a hopper endless belt; means for mounting said endless belt whereby the upper run thereof is positioned immediately beneath said hopper to form the bottom thereof; said hopper having an outlet passageway formed therein adjacent to and above said belt thereby forming a mouth through which material in the hopper is dischargeable under the influence of movement of said belt, such material being dischargeable downwardly at one extremity of such upper run of said endless belt, said passageway being shaped to impart a ribbon-like configuration to the stream of material discharged therefrom, the mouth of said hopper being positioned above the input extremity of the aforementioned channel, and means for driving said hopper endless belt and said members, the latter at a greater velocity than the former.

3. In apparatus for filling valve bags, a valve bag packer unit including: a peripherally grooved wheel member mounted for rotation upon a substantially horizontal axis, a belt member, means for mounting the belt member for movement through a closed path including a path coming into contact with a portion of the circumference of said wheel and running from an upper input position around such wheel portion to a lower discharge position at the bottom of the wheel, such belt member tangentially departing from the wheel near the latter position, such tangential direction being substantially horizontal, and a valve bag filling tube positioned to receive material from said belt member at such discharge position thereof; a hopper; an endless hopper belt having means for mounting same with the upper run positioned immediately beneath said hopper to form the bottom thereof, said hopper having means defining a passageway through a portion thereof immediately above and adjacent said belt, such passageway defining means and belt forming a mouth shaped for imparting a ribbon-like configuration to material discharged from said hopper, said hopper and its belt bottom being positioned above the aforementioned input position, a ribbon of material discharged from said hopper at one extremity of said endless belt falling into the aforementioned channel formed between said peripherally grooved wheel and belt; and means for driving said members and hopper belt, the former at a greater velocity at said wheel periphery than the velocity of said hopper belt.

WILLIAM R. PETERSON.

REFERENCES CITED

The following references are of record in the file of this patent:

UNITED STATES PATENTS

| Number | Name | Date |
|---|---|---|
| 126,732 | Mitchell et al. | May 14, 1872 |
| 579,445 | Richards | Mar. 23, 1897 |
| 589,274 | Richards | Aug. 31, 1897 |
| 703,547 | Cook | July 1, 1902 |
| 810,694 | Arnett | Jan. 23, 1906 |

(Other references on following page)

UNITED STATES PATENTS

| Number | Name | Date |
|---|---|---|
| 888,615 | Humphreys | May 26, 1908 |
| 1,098,108 | Hager | May 26, 1914 |
| 1,422,002 | Shaw | July 4, 1922 |
| 1,795,265 | Rice | Mar. 3, 1931 |
| 1,851,017 | Middleboe | Mar. 29, 1932 |
| 1,881,859 | Mullendore | Oct. 11, 1932 |
| 1,913,868 | Andreas | June 13, 1933 |
| 1,926,802 | Currier | Sept. 12, 1933 |
| 1,979,492 | Russell | Nov. 6, 1934 |
| 2,004,593 | Andreas | June 11, 1935 |
| 2,205,010 | Hartman | June 18, 1940 |
| 2,232,437 | Bushman | Feb. 18, 1941 |
| 2,260,718 | Merrifield | Oct. 28, 1941 |
| 2,305,484 | Merchen | Dec. 15, 1942 |

FOREIGN PATENTS

| Number | Country | Date |
|---|---|---|
| 339,914 | Great Britain | Dec. 18, 1930 |